(No Model.)
B. F. JACKSON.
CAR BRAKE.
No. 573,663.　　　　　　　　　　　　Patented Dec. 22, 1896.
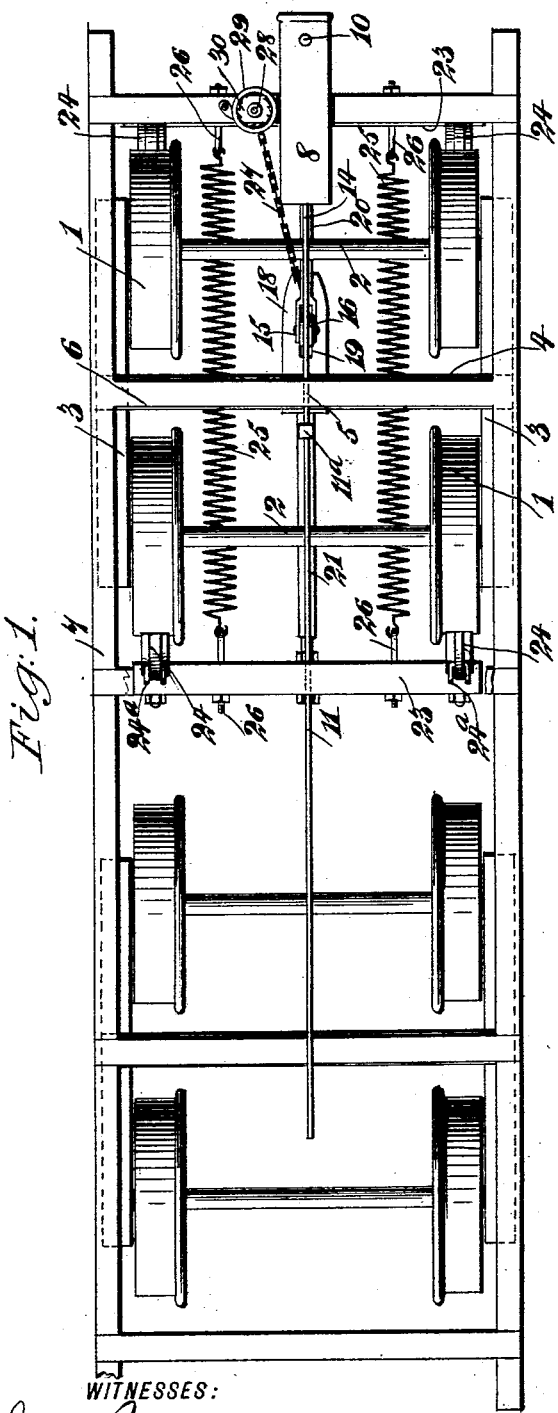
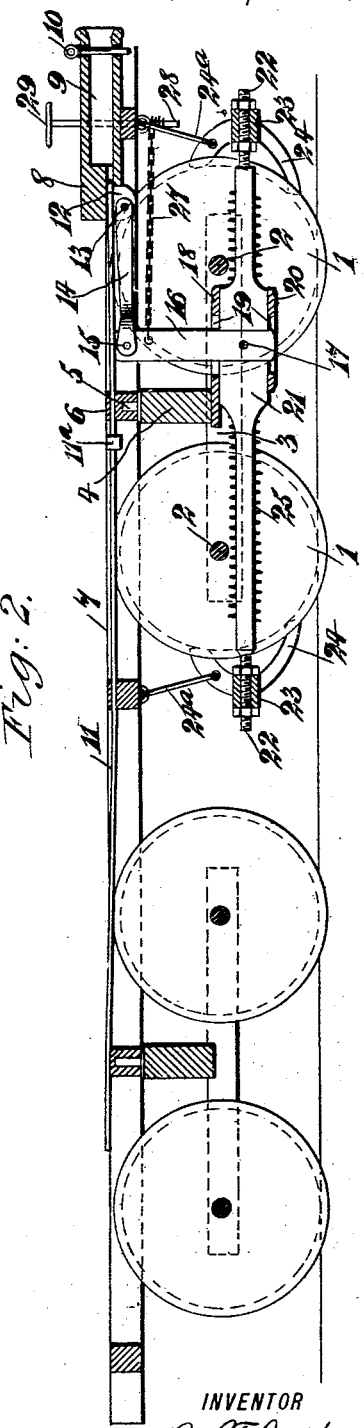
WITNESSES:
INVENTOR
B. F. Jackson.
BY
ATTORNEYS

UNITED STATES PATENT OFFICE.

BENJAMIN F. JACKSON, OF SUTTON, WEST VIRGINIA, ASSIGNOR OF ONE-HALF TO MARSHALL L. HUGHES, OF SAME PLACE.

CAR-BRAKE.

SPECIFICATION forming part of Letters Patent No. 573,663, dated December 22, 1896.

Application filed February 14, 1896. Serial No. 579,205. (No model.)

*To all whom it may concern:*

Be it known that I, BENJAMIN F. JACKSON, of Sutton, in the county of Braxton and State of West Virginia, have invented new and useful Improvements in Car-Brakes, of which the following is a full, clear, and exact description.

This invention relates to certain improvements in car-brakes, and has for its object to provide a brake of a simple and inexpensive construction, which shall be adapted for use on steam or street railway cars, and which shall be sufficiently strong and durable to withstand the strains, and shall be adapted to stop a car quickly and without imposing too much strain upon the running-gear or upon the brake apparatus itself.

The invention consists in a brake comprising brake-bars extending transversely of the car and carrying shoes at their ends, said bars being provided with springs arranged to hold them normally in engagement with the wheels, rods connected to the brake-bars and adapted when moved in opposite directions to place the brake-shoes out of engagement with the car-wheels, whereby the springs are placed under tension, and a lever mechanism connected to and arranged to actuate said rods to hold the brake-shoes out of operation when the car is in movement.

The invention also contemplates certain novel features in the construction, combination, and arrangement of the various parts of the improved brake mechanism, whereby certain important advantages are attained, and the device is made simpler, cheaper, and otherwise better adapted and more convenient for use than various other similar devices heretofore employed, all as will be hereinafter more fully set forth.

The novel features of the invention will be carefully defined in the claims.

Reference is to be had to the accompanying drawings, forming a part of this specification, in which similar characters of reference indicate corresponding parts in both views.

Figure 1 is a plan view showing the running-gear and lower framework of a car provided with my improved brake mechanism, and Fig. 2 is a vertical section taken longitudinally through the car.

In the views, 1 1 indicate the wheels of a car fixed on the opposite ends of axles 2, said axles being arranged in pairs and connected at their ends to a truck-frame comprising side bars 3, wherein the ends of the axles are journaled outside the wheels 1, and a cross-bar 4, extending transversely across the truck-frame and connected at its ends to the respective portions of its side bars thereof, said cross-bar 4 being provided with a king-bolt 5, arranged to turn in a socket in a cross-beam 6, forming part of the lower framework 7 of the car-body.

The car is provided at opposite ends in the usual way with draw-heads 8, having openings 9 to receive coupling-links, and provided with a coupling-pin 10, whereby the coupling-link may be held in place in the draw-head, and the inner ends of the respective draw-heads 8 (of which only one is shown in the drawings) are connected together by a bar 11, extending longitudinally of the car-body, as clearly shown in the drawings.

The draw-head 8 is provided at its lower part with depending lugs 12, spaced apart and perforated to receive a bolt 13, extending between them, on which bolt is pivotally mounted between the lugs 12 the forward end of a link 14, the rear end of which is coupled, as shown at 15, to a brake-lever 16, extending downward and pivoted at 17 inside a casing or box 18, secured under the central portion of the cross-bar 4 of the brake-frame and having openings 19 in its upper and lower sides to permit the passage through it of the ends of said lever 16.

The casing or box 18 is formed with a passage extending through it substantially at right angles to the lever 16 and alined with the length of the car, in which passage are arranged the enlarged ends of brake-rods 20 and 21, extending in opposite directions and slidingly mounted in said passage in the box or casing, each of the brake-rods being provided at its outer end with a screw-shank 22, adapted to pass through one of the brake-beams 23, and being provided with nuts, as clearly shown in Fig. 2, whereby it is secured to said brake-beam.

The brake-beams 23 extend transversely across the opposite ends of the truck-frames and are provided at their opposite ends with shoes 24, adapted to engage the treads of the wheels 1, as shown, and said brake-beams, together with the rods 20 and 21, are supported by links 24ª, extending downward from the car-body 11, whereon they are pivotally mounted, as shown in Fig. 2. The brake-rods 20 and 21 are arranged centrally with respect to the brake-beams 23, and between said brake-beams, on opposite sides of the rods 20 and 21, extend springs 25 of suitable strength, having at their ends eyebolts 26, connecting them with the said brake-beams and serving to permit the tension of the springs to be adjusted.

The upper end of the lever 16 is connected with a chain 27, which extends toward the end of the car and is arranged to be wound on the lower end of a brake-staff 28, mounted to turn on the end of the car and having at its upper end a hand-wheel 29, whereby it may be conveniently turned, and said brake-staff is also provided with a pawl-and-ratchet mechanism 30, as clearly seen in Fig. 1, whereby it may be held against movement when turned to wind up the chain 27 on its lower end.

In operation it will be seen that the springs 25, being connected at their opposite ends to the brake-beams 23, serve to hold the shoes 24 normally engaged with the treads of the car-wheels 1, and when it is desired to remove the brakes it is only necessary to turn the hand-wheel 29 so as to wind up the chain 27 on the lower end of the brake-staff 28, whereby the lever 16 will be swung pivotally and its lower end caused to move the brake-rods 20 and 21 in opposite directions, so as to disengage the brake-shoes from the wheel-treads. When the brake-staff is released, it will be seen that the springs 25 will immediately contract and draw the shoes 24 into frictional contact with the wheels.

When a car provided with my improved brake mechanism is coupled in a train, the draft exerted upon the draw-head 8 will serve to swing the lever 16 pivotally, owing to the connection between the lever and the draw-head, whereby the brakes will be automatically removed from engagement with the wheels without necessitating the operation of the brake-staff 28. The draw-bar 11 has a stop 11ª thereon to engage the bearing 6 and relieve the tension on the working parts when the car is in motion.

The improved car-brake constructed as above described is of an extremely simple and inexpensive nature, and is especially adapted for use on railway-cars, since it will be seen that in case of derangement of the brake levers or rods the springs 25 will serve to automatically apply the brakes without necessitating any action whatever on the part of the train-hands, and it will also be obvious that the invention is susceptible of considerable modification without material departure from its principles or spirit, and for this reason I do not wish to be understood as limiting myself to the exact form and arrangement of the parts herein set forth.

Having thus described my invention, I claim as new and desire to secure by Letters Patent—

1. In a car-brake, the combination of wheels, brake-beams having shoes engaging the wheel-treads, springs connecting the brake-beams and arranged to hold the same with their shoes normally engaging the car-wheels, rods having their inner ends adjacent and having their outer ends connected to the brake-beams, a draw-head, and a lever connected to and arranged to be moved by said draw-head, said lever having engagement with the inner ends of the brake-bars, and being adapted when moved to actuate said brake-rods to move the brake-beams, substantially as set forth.

2. In a car-brake, the combination of wheels, brake-beams having shoes engaging the wheels, a truck-frame whereon the wheels are mounted, a car-body supported on the truck-frame, means for supporting the brake-beams from the car-body, a box carried on the truck-frame and having a passage extending through it, springs connecting the brake-beams and arranged to hold the same with their shoes normally engaging the wheels, brake-rods connected at their outer ends to the brake-beams and having their inner ends arranged to slide in the passage in said box, a pivoted brake-lever having one end engaging the brake-rods and adapted to move the same in opposite directions, a draw-head, and a connection between the draw-head and the lever, arranged when the draw-head is moved to actuate said lever to disengage the brake-lever from the wheels, substantially as set forth.

3. In a car-brake, the combination of wheels, brake-beams having shoes engaging the wheels, a truck-frame whereon the wheels are mounted, a car-body supported on the truck-frame, means for supporting the brake-beams from the car-body, a box carried on the truck-frame and having a passage extending through it, springs connecting the brake-beams and arranged to hold the same with their shoes normally engaging the wheels, brake-rods connected at their outer ends to the brake-beams and having their inner ends arranged to slide in the passage in said box, a pivoted brake-lever having one end engaging the brake-rods and adapted to move the same in opposite directions, a draw-head, a connection between the draw-head and the lever, arranged when the draw-head is moved to actuate said lever to disengage the brake-lever from the wheels, a brake-staff having a pawl-and-ratchet device, and a chain connected to the lever and arranged to be wound on the brake-staff, substantially as set forth.

BENJAMIN F. JACKSON.

Witnesses:
FRED L. FOX,
L. H. KELLY.